Figure 1:
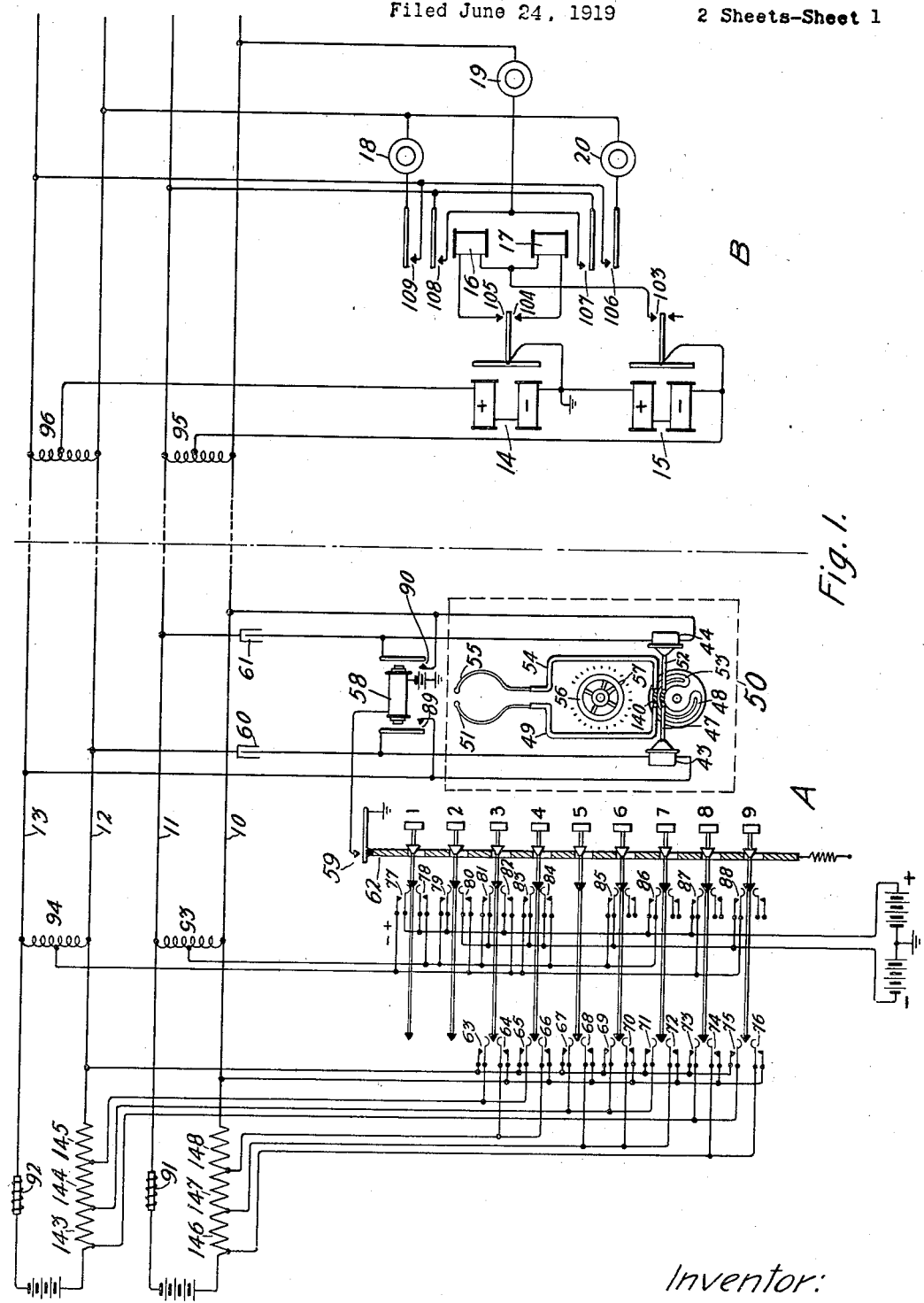

Patented July 15, 1924.

1,501,109

UNITED STATES PATENT OFFICE.

JOHN B. HARLOW, OF UPPER MONTCLAIR, NEW JERSEY, ASSIGNOR TO WESTERN ELECTRIC COMPANY, INCORPORATED, OF NEW YORK, N. Y., A CORPORATION OF NEW YORK.

SWITCHING SYSTEM.

Application filed June 24, 1919. Serial No. 306,406.

*To all whom it may concern:*

Be it known that I, JOHN B. HARLOW, a citizen of the United States, residing at Upper Montclair, in the county of Essex, State of New Jersey, have invented certain new and useful Improvements in Switching Systems, of which the following is a full, clear, concise, and exact description.

This invention relates to switching systems and particularly to systems of this nature employed in detecting the presence of submarine or other marine vessels.

In such systems, especially those in which certain areas are equipped with a plurality of distributed submerged detectors responsive to mechanical vibrations propagated through the water from a submarine or other marine vessel producing such vibrations and which may be selectively subjected to binaural observation, it is desirable to provide means for quickly and readily associating individual pairs of the detectors with the observer's receiving device. This arrangement is especially desirable in case fixedly positioned detectors are employed for the detection and location of a rapidly moving source of vibration. In order to locate such sources with precision, it is also necessary that each detector produce approximately the same observable effect at the observer's receiving device for a particular set of vibrations.

It is an object of the present invention to provide a system in which the various pairs of detectors may be quickly and selectively associated with the observer's receiving device, such device being rendered ineffective during the selecting periods and the selected pair being definitely identified at the observer's station, the flow of current for the detectors being approximately the same independently of the location of the associated stations.

To attain this object in accordance with a feature of the invention, means at each detecting station is individually responsive to the simultaneous application of a particular combination of current polarities to a phantom circuit composed of two physical transmission line circuits leading from the binaural observing station to the individual detectors of a selected pair.

In accordance with another feature of the invention, the observing means at the observer's station is rendered ineffective during each selecting period and is restored to operative condition upon the association of the desired pair of detectors with the transmission lines.

In accordance with a further feature of the invention, means controlled by the selecting means insures the same flow of current through the operating circuit of the current varying device of the detectors irrespective of the location of the station. More specifically, means is provided for selectively varying the resistance of the operating circuits of the detectors.

In accordance with another feature of the invention, indicating means associated with the observer's selecting means positively identifies the selected pair of detectors.

Figure 2:
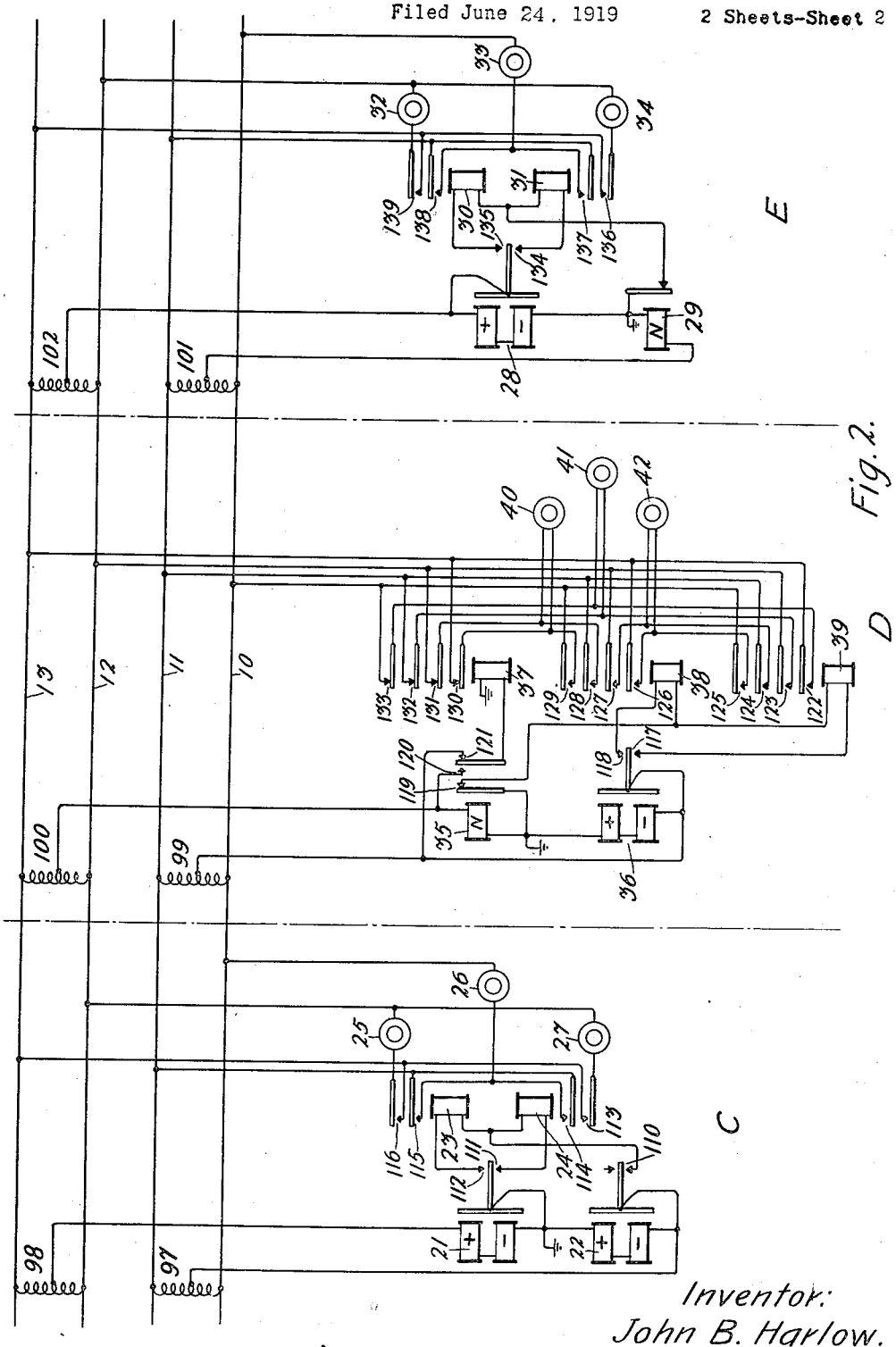

These and other features of the invention will clearly appear from the following specification and the annexed drawings, Figs. 1 and 2 of which, when placed end to end, with Fig. 1 at the left, illustrate one embodiment thereof as applied to a submarine detection system.

Referring to the drawing, keys 1 to 9 inclusive, which may be of any suitable multiple indicating type adapted to be individually locked in their final positions by a slidable common plate 62 until another key is actuated, are provided at an observer's station A which may be conveniently located on the shore. These keys control the application of different combinations of current polarities to a phantom circuit composed of side circuits or physical lines 10—11 and 12—13 extending to detection stations B, C, D and E, ordinary simplexing coils 93 to 102, inclusive, being provided at the various stations. Relays 14, 15, 16 and 17 at station B; 21, 22, 23 and 24 at station C; 35, 36, 37, 38 and 39 at station D and 28, 29, 30 and 31 at station E selectively operated by such currents control the association with the physical pairs 10—11 and 12—13 of detectors 18, 19, 20, 25, 26, 27, 32, 33, 34, 40, 41 and 42, which detectors may be of any suitable type having mechanical vibration responsive members controlling the operation of devices for varying the electrical conditions of an associated circuit in response to the vibrations of such members. Receivers 43 and 44 of a binaural observation set 50 are also bridged across the pairs of conductors 10—11 and 12—13 at the observer's station A. Air tubes 47, 48 and 49 convey the sounds produced by receiver 43, to ear piece 51, while air tubes 52, 53 and 54 convey the sounds produced by receiver 44, to ear piece 55. The relative effective lengths of the adjustable air tubes 48 and 53 with respect to the stop member 140 may be varied by rotating the hand-wheel 56. The amount of displacement of the tubes is indicated by means of a pointer 57 secured to the wheel 56. An observer's set suitable for this purpose, although the invention is obviously not limited to such a structure, is disclosed in a copending application to Charles R. Moore, Serial No. 313,729, filed July 22, 1919. A slow-release relay 58 controlled by a common passing key contact 59 renders the observation set 50 ineffective while the detectors are being selected. The contact 59 is under the control of plate 62, which as previously described is shifted upon the depression of any one of the keys 1 to 9 inclusive, and is closed only during the period that the selected key is being depressed. That is, the plate 62 is restored to normal by a retractile spring when the selected key is depressed to its fullest extent, thereby opening contact 59 and causing the deenergization of relay 58.

It is thought that the invention may be more fully comprehended from the following description of the operation of the system shown on the drawing.

The observer actuates key 1, thereby closing the passing contact 59 by the shifting of common plate 62 to operate slow-release relay 58 which short-circuits receivers 43 and 44, through the closure of contacts 89 and 90. Upon reaching its final position, such key establishes a circuit from battery, through contact 78 of key 1, the simplexed conductor comprising coil 93, conductors 10 and 11, and coil 95 and the winding of polarized relay 15 at station B to ground, and another circuit from battery, through the contact 77 of key 1, the simplexed conductor comprising coil 94, conductors 12 and 13 and coil 96, and the winding of polarized relay 14 at station B to ground. The direction of flow of the current through these circuits is such that relays 14 and 15 operate and close their contacts 105 and 103 respectively. Relay 16 then operates in parallel with relay 15 over a circuit including contact 103 of relay 15, the winding of relay 16, and contact 105 of relay 14 to ground. The closure of contact 109 of relay 16 bridges detector 18 across conductors 12 and 13, while the closure of contact 108 of such relay bridges detector 19 across conductors 10 and 11. Although, due to the connection of the source of current to the simplexed conductors, relays 21 and 22 at station C, relays 28 and 29 at station E and relay 36 at station D operate, no material effect on the system is produced thereby. Relay 35 at station D operating upon current flowing from simplexing coil 100 through the winding of relay 35 to ground, causes the operation of relay 37 due to current flowing from simplexing coil 100, through contact 120 of relay 35, and the winding of relay 37 to ground. The opening of contacts 132 and 133 of relay 37 disconnects detector 41 from its normal bridged relation to conductors 10 and 11, while the opening of contacts 130 and 131 of relay 37 disconnects detector 40 from its normal bridged relation to conductors 12 and 13.

Current is now supplied to detector 18 over a circuit established from battery, through the retardation coil 92, conductor 13, contact 109 of relay 16, the current-varying device of detector 18, the conductor 12, and the resistance units 145, 144 and 143 in series to the other side of battery. Current is also supplied to detector 19 over a similar circuit established from battery, through the retardation coil 91, conductor 11, the contact 108 of relay 16, the current-varying device of detector 19, the conductor 10 and the resistance units 148, 147 and 146 in series to the other side of battery. Relay 58 having released due to the opening of contact 59, the current variations produced by the vibrations of the responsive member of detector 18 flow from conductor 13, through the winding of receiver 43 and the condenser 60 to conductor 12, while the current variations caused by the vibrations of the responsive member of detector 19 flow from conductor 11, through condenser 61 and the winding of receiver 44 to conductor 10. The electrical characteristics of simplexing coils 93 to 102 are such that they do not materially attenuate the flow of current through these physical or side circuits. The sounds produced in receiver 43 in response thereto are conveyed to the ear piece 51 through air tubes 47, 48 and 49, while the sounds produced by receiver 44 are conveyed to the ear piece 55 through air tubes 52, 53 and 54. The hand-wheel 56 is then properly rotated to vary the effective lengths of the air tubes 48 and 53 with respect to stop member 140 until the relatively effective lengths of these tubes are so adjusted that the observer receives the impression that the source of sound is directly ahead when binaurally listening to the sounds emitted from the ear pieces 51 and 55. The position of the pointer 57 with relation to its associated scale indicates the angular relation of the source of vibration to a base line joining the detectors 18 and 19.

After the observer has noted the position of the pointer 57, key 2 is actuated which shifts the common locking plate 62 sufficiently to release key 1, the slow release relay 58 being again momentarily operated, by the closure of contact 59, to short-circuit the receivers 43 and 44. The restoration of key 1 causes the release of all operating relays at stations B, C, D and E, disconnecting detectors 18 and 19 from the listening circuits and reconnecting detectors 40 and 41 thereto. Upon key 2 reaching its final position, a circuit is established from battery, through contact 79 of key 2, the simplexed conductor including conductors 10 and 11, and coils 93 and 95, and the winding of polarized relay 15 to ground, and another circuit is completed from battery, through the contact 80 of key 2, the simplexed conductor including conductors 12 and 13 and coils 94 and 96, and the winding of polarized relay 14 to ground. The currents flow through these circuits in such directions that relay 14 closes its contact 104 and relay 15 closes its contact 103. Relay 17 is thereby operated by current flowing from the simplexing coil 95, contact 103 of relay 15, the winding of relay 17, and contact 104 of relay 14 to ground. The closure of contact 107 of relay 17 bridges detector 19 across conductors 10 and 11, while the closure of contact 106 thereof bridges detector 20 across conductors 12 and 13. Relays 21 and 22 at station C, relays 28 and 29 at station E and relay 36 at station D also operate without material effect, while relays 35 and 37 at station D operate as before to disconnect detectors 40 and 41 from conductor pairs 10—11 and 12—13.

The selected detectors 19 and 20 are thereupon supplied with operating current over circuits similar to those previously described for detectors 18 and 19 except that contacts 106 and 107 of relay 17 are included therein instead of contacts 108 and 109 of relay 16. The observer now binaurally observes the sounds produced in receivers 43 and 44 in a manner similar to that described for detectors 18 and 19.

After observing the angular relation of the source of vibration to the base line joining detectors 19 and 20, as indicated by the position of pointer 57 when the binaural balance has been obtained, key 3 is actuated, key 2 being thereby released to release the operated relays, and relay 58 being momentarily operated as before. Upon key 3 reaching its final position, a circuit is established from battery, through contact 81 of key 3, the simplexed conductor including conductors 10 and 11, and the associated simplexing coils 93 and 97, and the winding of polarized relay 22 to ground, while another circuit is established from battery, through contact 82 of key 3, the simplexed conductor including conductors 12 and 13, and the associated simplexing coils 94 and 98 and the winding of relay 21 to ground. Currents flow through these circuits in such directions that relay 22 in operating closes contact 110, while relay 21 closes contact 112. Relay 23 is thereupon operated by the current supplied from the simplexing coil 97 flowing through contact 110 of relay 22, the winding of relay 23, and contact 112 of relay 21 to ground. The closure of contact 116 of relay 23 includes detector 25 in a bridge across conductors 12 and 13, while the closure of contact 115 of such relay bridges detector 26 across the conductors 10 and 11. Relays 14 and 15 at station B, relay 36 at station D, relays 28 and 29 at station E also operate without material effect due to the current supplied from the simplexing coils, and as before, relays 35 and 37 at station D also operating upon such current disconnect detectors 40 and 41 from conductor pairs 10—11 and 12—13. Contacts 63 and 64 of key 3, being also closed, short circuit resistances 145 and 148 respectively, so that approximately the same amount of current flows in the operating circuits completed for detectors 25 and 26 as in the circuits previously traced for detectors 18, 19, and 20. Except for this decrease in resistance to offset the increase in resistance of the conductors caused by the greater distance of station C from station A and for the substitution of contacts 115 and 116 of relay 23 for contacts 108 and 109 of relay 16, these circuits are similar to those previously described for detectors 18 and 19.

After observing the position of the pointer 57 upon obtaining the binaural balance of the sounds produced in the receivers 43 and 44 in response to the vibrations of detectors 25 and 26, key 4 is actuated, releasing the previously actuated key and the associated operated relays and momentarily operating relay 58 as before. The complete actuation of key 4 connects battery through contacts 84 and 83 of key 4 to simplexed conductors including conductors 10—11 and 12—13 respectively. Currents flow over these conductors in directions to cause relays 21 and 22 to close contacts 111 and 110 respectively. Relay 24 is thereupon operated by current supplied from simplexing coil 97, through contact 110 of relay 22, the winding of relay 24 and contact 111 of relay 21 to ground. The closure of contact 114 of relay 24 bridges detector 26 across conductors 10 and 11, while the closure of contact 113 thereof bridges detector 27 across conductors 12 and 13. Other relays operate without material effect as in the case of the selection of detectors 25 and 26, while relays 35 and 37 also operate as before to render detectors 40 and 41 ineffective. Contacts 65 and 66 of key 4 also closing coincidently with contacts 83 and 84 short circuit resistance units 145 and 148 as in the case of key 3 so that detectors 26 and 27 are supplied with currrent over circuits similar to those previously described for detectors 25 and 26 except that the contacts of relay 24 are substituted for those of relay 23.

After making the observations previously described, key 5 is actuated, releasing key 4 and the relays controlled thereby and momentarily operating relay 58 as before. No current being impressed upon the phantom circuit, no relays associated therewith are operated at the various detecting stations but detectors 40 and 41 being normally bridged across conductors 12—13 and 10—11 through normally closed contacts 130 to 133 inclusive, of relay 37, their operation may be observed as previously described. In this instance contacts 67 and 68 of key 5 close to short circuit resistance units 144—145 and 147—148 respectively, so that current is supplied to detectors 40 and 41 through resistance units 143 and 146 respectively, the latter units possessing the requisite resistance values in each case to insure substantially the same amount of current flowing through the circuits as in the previous instances.

The subsequent actuation of key 6, after the usual observations have been made as before, releases the preceding key and momentarily operates relay 58, current thereupon being supplied to simplexed conductors 10—11 through contact 85 of key 6, while no current is impressed upon the simplexed conductors 12—13. Relay 37 is operated by current flowing from simplexing coil 99 through contact 121 of relay 35 and the winding of relay 37 to ground to disconnect detectors 40 and 41 from the conductor pairs 12—13 and 10—11 respectively, and due to the direction of flow of the current through the winding of relay 36 from simplexing coil 99 the latter relay closes its contact 117. Relay 39 thereupon operates upon current supplied from simplexed conductors 10 and 11, through contact 117 of relay 36, the winding of relay 39 and contact 119 of relay 35 to ground. The closure of contacts 122 and 123 of relay 39 bridges detector 41 across conductors 12 and 13 while the closure of contacts 124 and 125 thereof bridges detector 42 across conductors 10 and 11. Relays 15, 22 and 29 also operate without material effect upon the system. Due to the simultaneous closure of contacts 69 and 70 of key 6, battery is supplied to these detectors over circuits similar to those used for detectors 40 and 41 at the same station except that the contacts of relay 39 are substituted for the contacts of relay 37.

The usual observations having been made as previously described, key 7 is actuated, as before releasing the previously actuated key to release the operated relays and momentarily operating relay 58, and in addition, supplying current to simplexed conductors 10—11 through contact 86 of key 7, no current being supplied to simplexed conductors 12—13. Relay 37 operated thereby as before, disconnects detectors 40 and 41 while relay 36 closes its contact 118, due to the direction of current flowing therethrough, thereby permitting relay 38 to operate due to current supplied from the simplexing coil 99, through contact 118 of relay 36, the winding of relay 38 and contact 119 of relay 35 to ground. The closure of contacts 126 and 127 of relay 38 bridges detector 42 across conductors 12 and 13, while the closure of contacts 128 and 129 thereof bridges detector 40 across conductors 10 and 11. Relays 15, 22 and 29 also operate ineffectively as before, and the closure of contacts 71 and 72 of key 7 causes current to be supplied to detectors 40 and 42 over the same circuit as that prepared by key 5 for detectors 40 and 41 at the same station except for the substitution of the contacts of relay 38 for those of relay 37.

Key 8 being actuated after the operation of detectors 40 and 42 has been observed as before, releases key 7 to release the operated relays and to momentarily operate relay 58. Current is thereupon supplied through contact 87 of key 8 to the simplexed conductors 12—13 while no current is supplied to the simplexed conductors 10—11. Relay 35 operates due to current supplied from the simplexed conductors 12—13 and simplexing coil 100 thereby permitting the operation of relay 37 upon current supplied thereto from simplexing coil 100 through contact 120 of relay 35. Detectors 40 and 41 are thereupon disconnected from their operating circuits as before, and due to the direction of current flowing therethrough, from simplexing coil 102, relay 28 closes its contact 135 permitting relay 30 to operate upon current supplied thereto from the simplexing coil 102 through contact 135 of relay 28, the winding of relay 30 and the contact of relay 29 to ground. The closure of contact 139 of relay 30 bridges detector 32 across conductors 12 and 13 while the closure of contact 138 thereof bridges detector 33 across conductors 10 and 11. Relays 14 and 21 operate ineffectively and relays 35 and 37 operate successively to disconnect detectors 40 and 41 as before. The closure of contacts 73 and 74 of key 8 short circuits resistance units 143—144—145 and 146—147—148 so that operating current is supplied to detector 32 over a circuit extending from battery, through retardation coil 92, conductor 13, contact 139 of relay 30, the current-varying device of detector 32 and the conductor 12 to the other side of battery, while detector 33 receives current over a similar circuit extending from battery, through retardation coil 91, conductor 11, contact 138 of relay 30, the current-varying device of detector 33 and the conductor 10 to the other side of battery. The resistance of each of these circuits is such that the same amount of current flows therein as in the previous cases.

After the usual observations are made, key 9 is actuated, releasing key 8 to release the operated relays and momentarily operating relay 58 as before. Current is thereby supplied to simplexed conductors 12—13 through contact 88 of key 9, no current being supplied to the simplexed conductors 10—11. Relay 35 operates upon current supplied thereto from simplexing coil 100 to permit relay 37 to operate upon current supplied thereto from such coil through contact 120 of relay 35. Detectors 40 and 41 are thereby disconnected from their normal operating circuits. Due to the direction of current flowing from simplexing coil 102 through the winding of relay 28, such relay closes its contact 134, permitting the operation of relay 31 upon current supplied thereto from the simplexing coil 102 through contact 134 of relay 28, the winding of relay 31 and the normal contact of relay 29 to ground. By the closure of contact 137 of relay 31, detector 33 is bridged across conductors 10 and 11, while the closure of contact 136 of such relay bridges detector 34 across the conductors 12 and 13. Relays 14 and 21 also operate ineffectively and the closure of contacts 75 and 76 of key 9 prepares operating circuits for detectors 33 and 34 similar to those prepared for detectors 32 and 33 at the same station except for the substitution of the contacts of relay 31 for those of relay 30. After the operation of detectors 33 and 34 have been subjected to binaural observation, as previously described, another series of observations of the various stations may be made, the actuation of key 1 as before, releasing key 9 and the associated operated relays or key 9 may be released by shifting plate 62, thereby restoring the system to normal.

It will be noted that relay 58 operates to momentarily short circuit the receivers 43 and 44 during each selecting period, thus preventing the interference which might be caused by the introduction of clicks into the receivers during the switching operations.

It is evident that with this invention, the various detectors at a plurality of stations may be quickly arranged in predetermined pairs, the shift from one pair to any other pair requiring but a single selecting operation by the observer.

What is claimed is:

1. In a switching system, a phantom circuit, a selecting station associated therewith, a receiving device associated with each physical circuit of the phantom circuit, a source of current connected to each physical circuit, a plurality of selectable stations also associated with the phantom circuit, a plurality of vibration-responsive devices at each selectable station, means at the selecting station for selectively and simultaneously supplying different combinations of current polarities to the phantom circuit, and means at each selectable station individually responsive to the application of a particular combination of currents at the selecting station to selectively associate said vibration responsive devices in pairs with the physical circuits.

2. In a switching system, a line circuit, a selecting station and a plurality of selectable stations connected therewith, receiving means associated with said line circuit at said selecting station, a plurality of transmitting devices at each of said selectable stations, means at said selecting station for selectively applying different combinations of current polarities to said line circuit, a plurality of relays at each of said selectable stations, each responsive to a single application of current of predetermined polarity, a plurality of additional relays at each of said selectable stations selectively controlled by the operation of the first-mentioned relays thereat, and circuits controlled by said additional relays for selectively associating the respective transmitting devices with said line circuit.

3. In a switching system, a selecting station and a plurality of selectable stations, a phantom circuit extending from the selecting to the selectable stations, a plurality of detectors at each selectable station, means at the selecting station for selectively applying different combinations of current polarities to the simplexed conductors of said phantom circuit, a plurality of relays at each selectable station, each responsive to the application of current of a particular polarity at the selecting station, and means controlled by said relays at each of said selectable stations for selectively associating the conductors thereat with the physical circuits of said phantom circuit.

4. In a switching system, a receiving station, a line circuit extending therefrom, a receiver at the receiving station associated with the line, a source of current also associated with the line, selection controlling means at the receiving station, a plurality of impulse transmitters, means associated therewith and controlled by the selection controlling means to selectively associate the transmitters with the line circuit, and means controlled by the selection controlling means for selectively controlling the resistance of the line circuit.

5. In a switching system, a receiving station, a line circuit extending therefrom, a receiver at the receiving station associated with the line, a source of current also associated with the line circuit at the receiving station, selection controlling means at the receiving station comprising a plurality of keys, a plurality of transmitters, means associated therewith and controlled by the selection controlling means to selectively associate the transmitters with the line circuit, a plurality of resistance units of predetermined values included in the line circuit and controlled by said keys, and means controlled by the selection controlling means for selectively rendering ineffective particular ones of such resistance units as determined by the selected transmitters.

6. In a signaling system, a signaling circuit, a selecting station and a plurality of selectable stations connected therewith, signal receiving means associated with said line at said selecting station, a plurality of transmitting devices at each of said selectable stations, a plurality of relays at each of said selectable stations, means at said selecting station for selectively operating said relays, and means controlled by the relays at each of said selectable stations for associating the transmitting devices thereat in groups of two with said signaling circuit.

7. In a switching system, a selecting station, a plurality of selectable stations, a phantom circuit extending from the selecting to the selectable stations, a plurality of detectors at each selectable station, means at the selecting station for selectively applying different combinations of current polarities to the simplexed conductors of the phantom circuit, and means at each selectable station responsive to the application of a particular combination of such impulses for associating the conductors in groups of two with the physical circuits of the phantom circuit.

8. In a switching system, a selecting station, a plurality of selectable stations, a phantom circuit extending from the selecting to the selectable stations, a plurality of detectors at each selectable station, means at the selecting station for selectively applying different combinations of current polarities to the simplexed conductors of the phantom circuit, a plurality of relays at each selectable station responsive to the application of a particular combination at the selecting station for associating predetermined detectors thereat with the physical circuits of the phantom circuit, and means at the selecting station for selectively operating said relays to select said detectors in groups of two and to associate the selected detectors with the circuit.

9. In a switching system, a line circuit, a receiving station and a plurality of transmitting stations connected therewith, receiving means connected with said line circuit at said receiving station, means at the transmitting stations for selectively associating the said stations with said receiving means, a plurality of keys at said receiving station for controlling the operation of said selective means, a slow releasing relay, means controlled by said relay for rendering said receiving means ineffective during the selecting operation and means for operating said relay by the operation of any one of said keys.

In witness whereof, I hereunto subscribe my name this 17th day of June A. D., 1919.

JOHN B. HARLOW.